Aug. 31, 1926.
J. H. RAND
RECORD SHEET
Filed May 24, 1924     2 Sheets-Sheet 1
1,598,257
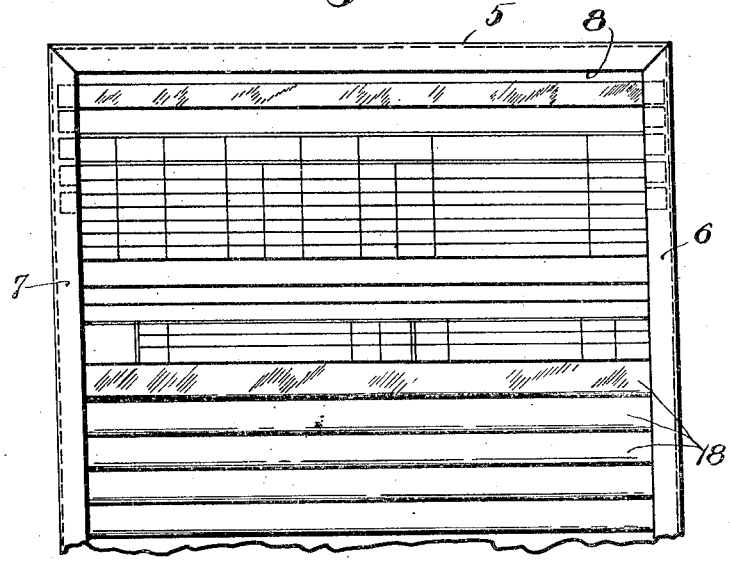
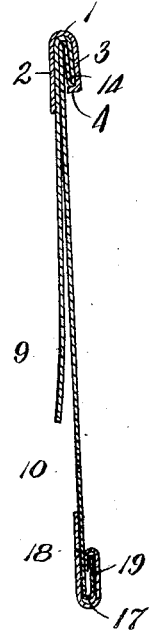
Fig. 1
Fig. 2
Fig. 3
Inventor:
James H. Rand,
by Roberts, Roberts & Cushman
Attys.

Aug. 31, 1926.

J. H. RAND

RECORD SHEET

Filed May 24, 1924 2 Sheets-Sheet 2

Inventor
James H. Rand,
by Roberts, Roberts & Cushman
Attys.

Patented Aug. 31, 1926.

1,598,257

UNITED STATES PATENT OFFICE.

JAMES H. RAND, OF NORTH TONAWANDA, NEW YORK, ASSIGNOR TO RAND KARDEX COMPANY, INC., OF NORTH TONAWANDA, NEW YORK, A CORPORATION OF DELAWARE.

RECORD SHEET.

Application filed May 24, 1924. Serial No. 715,613.

This invention relates to a record device particularly designed for use in indexes of the visible index type employing index elements arranged in overlapping spaced relation with their free margins exposed; and the object of the invention is to provide in combination with holders therefor removable record sheets constructed to form a number of leaves each presenting two pages, such that the several pages contained in the sheet may be readily exposed to view by swinging the leaves relatively to the holders, and attached to the holders in such a manner as to prevent accidental separation therefrom.

One preferred embodiment of the invention is illustrated in the accompanying drawings in which:—

Fig. 1 is a fragmentary elevation of an index device with the record sheets arranged therein;

Fig. 2 is a front view of a record sheet and holder;

Fig. 3 is an edge view of a record sheet and holder;

Fig. 4 is a front view of the record sheet unfolded; and

Fig. 5 is a rear view of the record sheet shown in Fig. 4 turned at 180° thereto.

Referring to the drawings in which a preferred embodiment of the invention is shown, the holder for the record sheet is in the form of a rail 1 of transparent sheet celluloid having a front wall 2 and a rear wall 3 united along one longitudinal edge. The rear wall 3 is provided with an inwardly extending lip 4 which is formed by bending the outer edge of the rear wall inwardly toward the front wall. The rails together with their record sheets are mounted in an index frame 5 of usual and well-known construction having side flanges 6 and 7 forming opposed channels with the back 8 of the frame to receive the outer ends of the rails 1. It will be understood that a series of similar holders each with its record sheet is mounted in the frame one above another in overlapped spaced relation so that the contents of any sheet may be exposed for examination or for the making of entries by swinging the overlapping sheets on their hinges upward and away from that one to which access is desired.

The record sheet which is made of card board, paper or other suitable material of sufficient weight and stiffness to maintain its position in the holder, is divided into two leaves 9 and 10 by a transverse hinge crease 11 in the region of its middle thus presenting 4 pages indicated respectively on the drawings as page 1, page 2, page 3 and page 4. These pages may be ruled or otherwise marked or inscribed in a manner appropriate to the use to which the record sheet is to be put. Thus by way of illustration and not of limitation the sheet is shown in the drawings as ruled and inscribed for a progress record for schools with columns arranged for the progress record, address record, employment record, and other indicia to indicate the status of an individual in school. It will be understood, however, that the device may be adapted to and used for various other purposes without departing from the spirit of the invention.

The sheet is provided with scorings 12 and 13 which as indicated by the dotted lines are parallel to and in close proximity to the hinge crease 11. The sheet is folded along the scoring 11 to provide two leaves, the front leaf being shorter than the back as indicated in Fig. 3. The folded margin is thereafter folded on itself along the scorings 12 and 13 to provide a marginal fold or bead 14. The record sheet after being folded is inserted into the rail 1, so that the marginal fold 14 is directly above the lip 4 on the rail in order to prevent movement of the record sheet transversely of the rail. Scorings 15 and 16 are provided on the sheet a slight distance from and parallel to the scorings 12 and 13 to provide hinge creases for the leaves to enable the leaves to be readily swung relatively to the holders 1. When it is desired to examine the pages of the record sheet the leaves 9 and 10 may be swung outwardly from the index frame 5 so that any page may be conveniently exposed to view.

The free margin of the leaf 10 is provided with a crease 17 and a sheath 18 of transparent sheet celluloid engages the rearwardly folded marginal portion 19 in order to protect the lower margin of the sheet and suitable indicia such as the name of the student and date of birth may be inscribed on page 3 to show through the sheath 18 to enable the record sheet to be readily identified.

It will be readily understood that after the student has left school the record sheet may be retained in the school files and removed from the index frame to make room for records of new students. Thus a record sheet is provided of substantially greater capacity than the single cards or sheets heretofore used for similar purposes and one in which all the entries although contained on different and normally concealed pages are immediately and readily available to the user for inspection or notation without removing the sheet from the holder.

I claim:

1. An index device comprising the combination of a record sheet transversely folded to form two sections, the folded margin being folded on itself to form a relatively narrow bead, each section comprising two pages of a series of pages included in the entire sheet, and a holder adapted to engage the bead and support the record sheet, the parts being so organized and arranged that all the pages of the series may be exposed to view by swinging the sections relatively to the holder without removing the record sheet from the holder.

2. An index device comprising the combination of a record sheet transversely folded to form two sections, the folded margin being folded on itself to form a relatively narrow bead, each section comprising two pages of a series of pages included in the entire sheet, and a holder of transparent sheet celluloid having a lip adapted to engage the bead and support the record sheet, the parts being so organized and arranged that all the pages of the series may be exposed to view by swinging the sections relatively to the holder without removing the record sheet from the holder.

3. An index device comprising the combination of a record sheet transversely folded to form two sections, the folded margin being folded on itself to form a relatively narrow bead, each section comprising two pages of a series of pages included in the entire sheet, and a holder adapted to engage the bead and support the record sheet, each section having a hinge crease adjacent the holder so that all the pages may be exposed to view by swinging on said hinge creases the sections relatively to the holder without removing the record sheet from the holder.

4. An index device comprising the combination of a record sheet transversely folded to form two sections, the folded margin being folded on itself to form a relatively narrow bead, each section comprising two pages of a series of pages included in the entire sheet, and a holder adapted to engage the bead and support the record sheet in depending position therefrom, the parts being so organized and arranged that all of the pages of the series may be exposed to view by swinging the sections relatively to the holder without removing the second sheet from the holder.

5. A record sheet comprising two leaves adapted to be folded together on a transverse crease, each leaf having a crease parallel to and in close proximity to said first crease connecting the two leaves to enable the folded margin to be folded on itself to form a relatively narrow bead for securing the sheet to a holder and also having a crease parallel to and in close proximity to each of said second creases to permit the leaves to be swung thereon to display the pages preceding the page displayed at the front.

6. A record sheet comprising two leaves adapted to be folded together on a transverse crease, one leaf being longer than the other, each leaf having a crease parallel to and in close proximity to said first crease connecting the two leaves to enable the folded margin to be folded on itself to form a relatively narrow bead for securing the sheet to a holder and also having a crease parallel to and in close proximity to each of said second creases so that all the pages of the series preceding the page displayed at the front may be exposed to view by swinging the leaves thereon.

Signed by me at Boston, Massachusetts, this 16th day of May, 1924.

JAMES H. RAND.